US006649286B2

(12) United States Patent
Kim et al.

(10) Patent No.: US 6,649,286 B2
(45) Date of Patent: Nov. 18, 2003

(54) FECONIN-BASED SOFT MAGNETIC THIN FILM COMPOSITION

(75) Inventors: Hi Jung Kim, Seoul (KR); Suk Hee Han, Seoul (KR); Ki Hyeon Kim, Seoul (KR); Yun Myung Kim, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 47 days.

(21) Appl. No.: 09/838,244

(22) Filed: Apr. 20, 2001

(65) Prior Publication Data

US 2002/0160229 A1 Oct. 31, 2002

(30) Foreign Application Priority Data

Feb. 20, 2001 (KR) .......................................... 2001-8522

(51) Int. Cl.[7] .................................................. G11B 5/66

(52) U.S. Cl. ................... 428/694 T; 428/900; 360/113; 360/119; 360/122; 360/126

(58) Field of Search ............................ 428/694 T, 900; 360/119, 122, 126, 113

(56) References Cited

U.S. PATENT DOCUMENTS

| | | | | |
|---|---|---|---|---|
| 5,057,380 A | * | 10/1991 | Hayashi et al. | 428/692 |
| 5,147,732 A | * | 9/1992 | Shiroishi et al. | 428/668 |
| 6,034,847 A | * | 3/2000 | Komuro et al. | 360/126 |
| 6,477,006 B1 | * | 11/2002 | Sato | 360/126 |

* cited by examiner

*Primary Examiner*—Leszek Kiliman
(74) *Attorney, Agent, or Firm*—Rosenberg, Klein & Lee

(57) ABSTRACT

Disclosed is a FeCoNiN-based soft magnetic thin film composition having the formula $Fe_xCo_yNi_zN_v$, wherein x, y, z and v are expressed in at % and satisfy $41 \leqq x \leqq 55$, $18 \leqq y \leqq 27$, $19 \leqq z \leqq 32$, $0 < v \leqq 5$, and $x+y+z+v=100$. The Fe-based ultrafine crystalline soft magnetic thin film composition is prepared by the more simplified method and much more excellent soft magnetic properties in the high-frequency than the conventional soft magnetic thin film compositions.

2 Claims, 6 Drawing Sheets

FECONIN-BASED SOFT MAGNETIC THIN FILM COMPOSITION

BACKGROUND OF THE INVENTION

1. Field of the Invention

The present invention relates to a Fe-based soft magnetic thin film composition, and more particularly, to a FeCoNiN-based soft magnetic thin film composition, which is prepared by addition of nitrogen to a soft magnetic thin film mainly composed of three elements, Fe, Co and Ni using a reactive sputtering to provide excellent high-frequency characteristics in the frequency band of several hundreds of MHz as well as an excellent corrosion resistance characteristic.

2. Description of the Related Art

With the tendency of high frequency and high integration of information and communication equipment, various electronic components concerned have been growingly miniaturized and surface-mounted. However, magnetic heads used in various information recording devices such as computers are much limited in implementation of high performance and high-frequency operations due to the magnetic properties of the soft magnetic material used for a magnetic core. In particular, magnetic devices such as voltage transformer, inductor, or the like for various electronic components are mostly used in the form of a core having a large volume, which is an obstacle to the development of such technologies. It is therefore necessary to develop a soft magnetic thin film material excellent in high-frequency characteristics in order to provide magnetic devices that have a light, thin and simple structure.

Examples of the conventional soft magnetic material include FeAlSi(sendust) alloy, NiFe(permalloy) alloy, and Co-based amorphous alloy. However, these materials have low saturation magnetization and poor high-frequency characteristics, and hence limitations in use for high-frequency thin film magnetic devices. As such, various magnetic thin films have recently been developed based on the Fe-based soft magnetic thin film having ultrafine crystals. These magnetic thin films entirely exhibit high saturation magnetization with poor high-frequency and corrosion characteristics and are disadvantageous in practical uses.

The present inventors have studied on the FeCoNi-based thin film obtained by the sputtering method, which maintains high-frequency characteristics in the frequency band of up to 100 MHz and has a high saturation magnetization and excellent soft magnetic properties. However, this thin film has such a low electrical resistivity and magnetic anisotropy as to abruptly decrease the value of effective permeability in the frequency region of greater than 100 MHz.

SUMMARY OF THE INVENTION

It is, therefore, an object of the present invention to solve the problem with the prior art and to provide a novel FeCoNiN-based thin film having an ultrafine crystalline structure obtained by the sputtering method without an additional heat treatment, wherein the thin film maintains a high saturation magnetization of more than 16 kG and has excellent soft magnetic properties at the high frequency band of above 100 MHz as well as a high corrosion resistance.

To achieve the above object of the present invention, there is provided a FeCoNiN-based soft magnetic thin film composition having the formula $Fe_xCo_yNi_zN_v$, wherein x, y, z and v are expressed in at % and satisfy $41 \leqq x \leqq 55$, $18 \leqq y \leqq 27$, $19 \leqq z \leqq 32$, $0 < v \leqq 5$, and x+y+z+v=100.

It is undesirable that Fe, Co and Ni contents of the composition are out of the range, because the soft magnetic properties or high-frequency characteristics may deteriorate.

In the present invention, the added amount of nitrogen is limited to 5 at % or less based on the total composition in order to provide an excellent corrosion characteristic and ultrafine crystals of the FeCoNi-based soft magnetic alloy. If the $N_2$ content exceeds the above value, soft magnetic properties such as saturation magnetization and effective permeability are undesirably deteriorated.

The FeCoNiN-based soft magnetic thin film composition of the present invention is prepared by the sputtering method or other physical vapor deposition.

Now, a process for preparing the FeCoNiN-based soft magnetic thin film composition using the sputtering method will be described as follows.

sputtering was performed using the composite target, which consisted of small pieces of Co and Ni, and a Fe disc target. Working pressure was controlled under the gas atmosphere having the nitrogen ($N_2$) content in the sputtering gas (Ar gas) being within 1 to 10% of the total amount of the gas. The thin film obtained was then measured in regard to magnetic properties as well as high-frequency and corrosion resistance characteristics without a separate heat treatment. As a result, it was found that the thin film comprised ultrafine crystals of α-FeCo, NiFe, and α-Co during the deposition process to provide excellent soft magnetic properties. These thin films were much superior in the high-frequency permeability to other soft magnetic thin films having the same grain size, which was because the thin film of the present invention contained $N_2$ as an additive to abruptly increase the electrical resistivity and had a HCP structure of α-Co to increase the magnetic anisotropy energy. The sputtering conditions used in the present invention are presented in Table 1.

TABLE 1

| Target | Composite Target (Fe Target + Co, Ni Small Pieces) |
|---|---|
| Substrate/Cooling Condition | Si (100)/Water Cooling |
| Vacuum Level | <1 × $10^{-6}$ torr |
| Distance between Target and Substrate | 6.5 cm |
| Radio-Frequency Input Power | 450 W |
| Total Gas Pressure (Argon + Nitrogen) | 1 mtorr |
| Nitrogen Partial Pressure ($P_{N2}$) | 1~10% |
| Thickness of Sample | 500 ± 100 nm |

DETAILED DESCRIPTION OF THE PREFERRED EMBODIMENT

Hereinafter, the present invention will be described in detail by way of the following examples and experimental examples, which are not intended to limit the scope of the present invention.

EXAMPLE 1

A FeCoNiN-based thin film of various compositions was prepared in the thickness range of 500 to 600 nm with a radio-frequency two-electrode magnetron sputtering apparatus. In order to vary the composition of the thin film, Co and Ni small pieces were arranged in the pinhole form on a Fe target while varying the number of the small pieces to regulate the Fe, Co and Ni contents. The $N_2$ content was controlled by variation of the flow rate of $N_2$ mixed with the Ar gas in the reactive sputtering.

The input power and the $N_2$ content in the mixed gas were controlled to obtain a thin film having a nano-sized ultrafine crystalline structure during the deposition. The thin film exhibited excellent soft magnetic properties due to the ultrafine crystalline structure. During the deposition, the input power was 450 W and the $N_2$ partial pressure was 1 to 10%. The composition and the magnetic properties of the thin film sample thus obtained are presented in Table 2. The coercive force ($H_C$) and the saturation magnetization ($M_S$) were measured with a vibration sample magnetometer (VSM), and the effective permeability ($\mu_{eff}$) being measured with a network analyzer and a high-frequency permeability meter capable of measuring the permeability up to 700 MHz using the s-parameter. The electrical resistivity was measured using a four probe method, and the composition of the thin film sample was analyzed with an electron probe microanalyzer.

As a result, the thin film was found to have excellent soft magnetic properties and high-frequency characteristics when the $N_2$ partial pressure in the total gas input was in the range of 2 to 5%.

Figure 1:
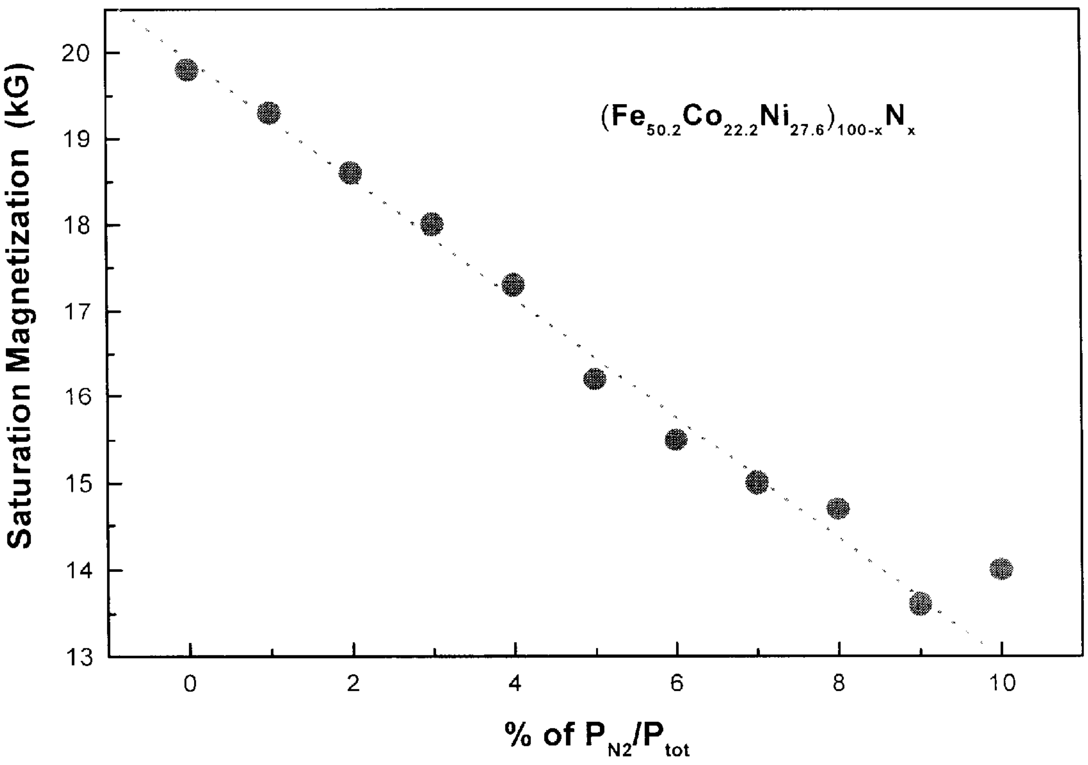
FIG. 1 is a graph showing a variation of saturation magnetization versus $N_2$ partial pressure of the FeCoNiN-based thin film according to the present invention.
Figure 2:
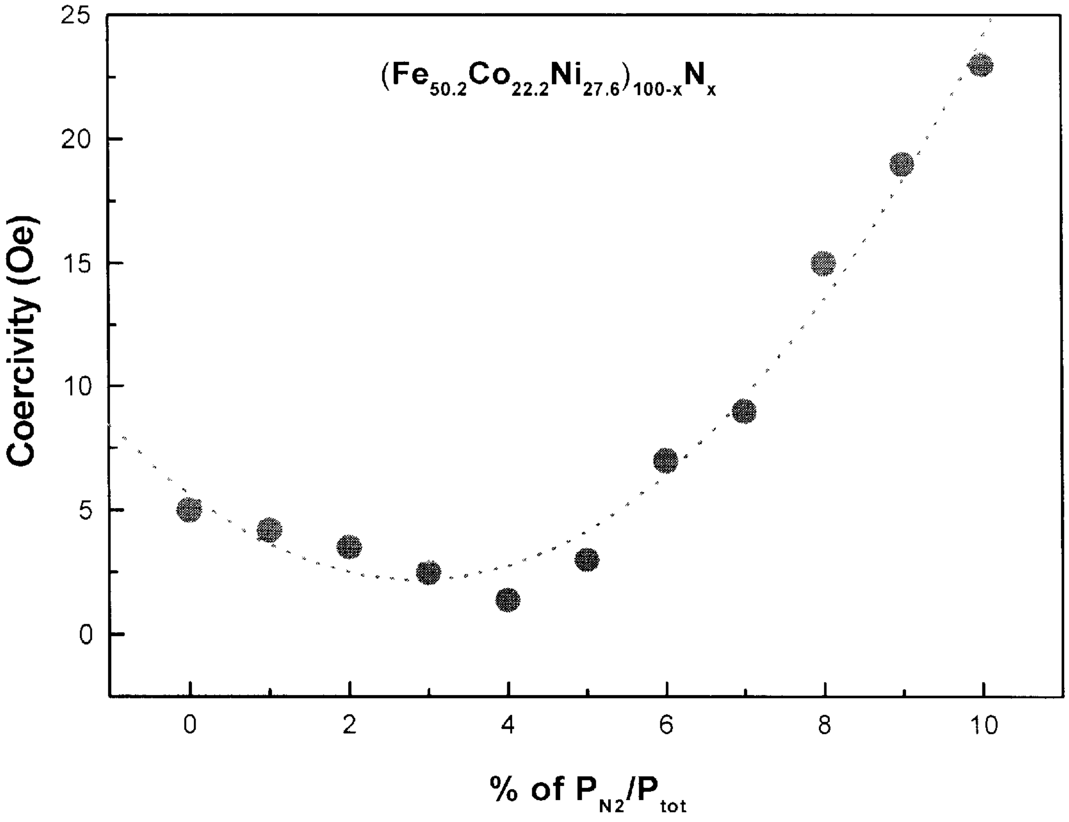
FIG. 2 is a graph showing a variation of coercive force versus $N_2$ partial pressure of the FeCoNiN-based thin film according to the present invention.

The variations of saturation magnetization and coercive force depending on the $N_2$ partial pressure are presented in FIGS. 1 and 2. The saturation magnetization decreases continuously with the increase of the $N_2$ partial pressure. Whereas the coercive force initially decreases with an increase in the $N_2$ partial pressure and reaches the minimum value at the $N_2$ partial pressure of 4%, and increase at the $N_2$ partial pressure above 4%.

Figure 3:
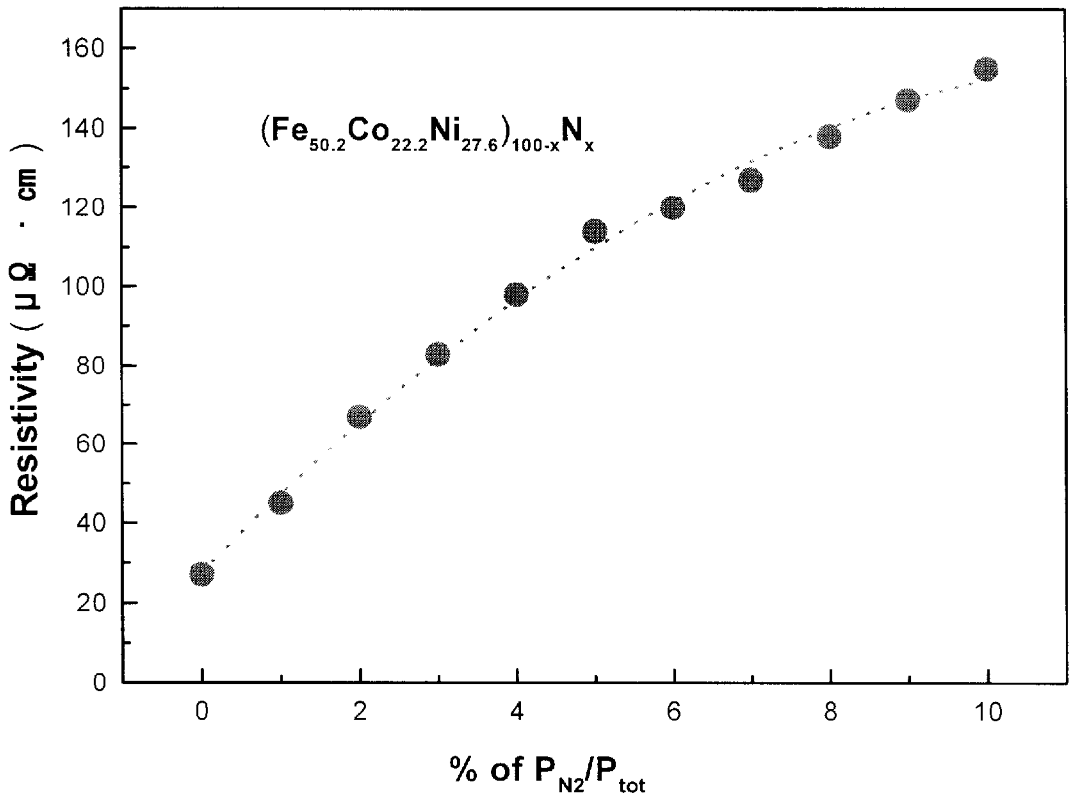
FIG. 3 is a graph showing a variation of electrical resistivity versus $N_2$ partial pressure of the FeCoNiN-based thin film according to the present invention.

FIG. 3 shows a variation of electrical resistivity versus $N_2$ partial pressure of the thin film, in which the electrical resistivity is abruptly increased with an increase in the $N_2$ partial pressure.

Figure 4:
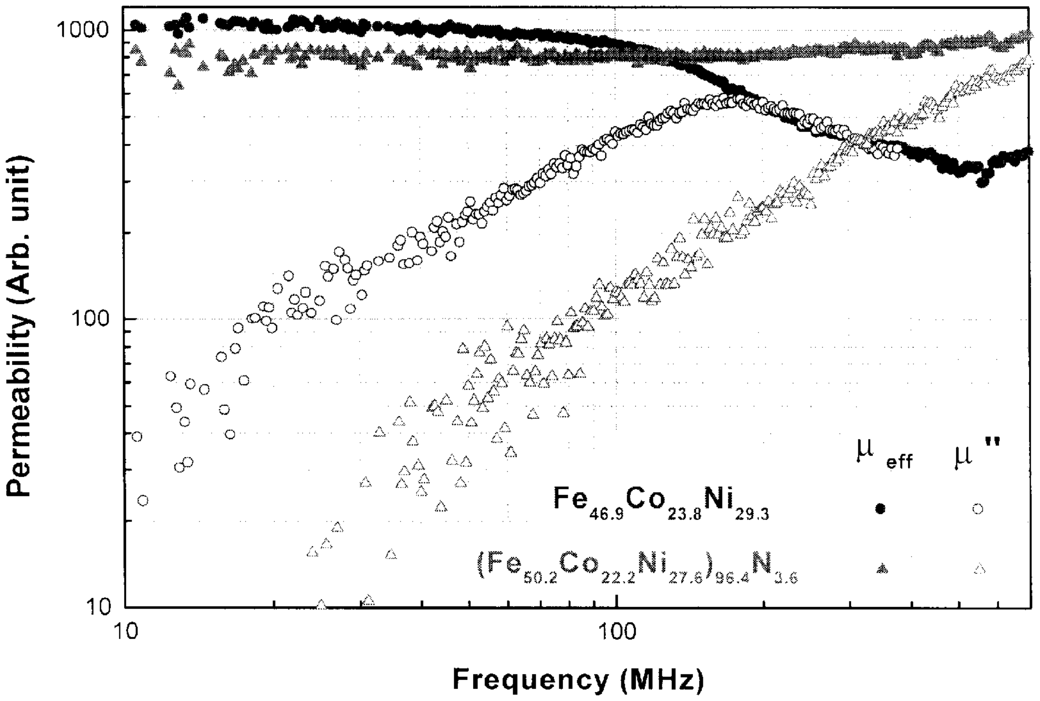
FIG. 4 is a graph showing the high-frequency characteristic of the FeCoNiN-based thin film according to the present invention as effective permeability when the $N_2$ partial pressure is 4%.

The FeCoNiN-based thin film and the FeCoNi-based thin film were compared in regard to the high-frequency characteristic of the effective permeability. The comparison results are presented in FIG. 4, in which $\mu_{eff}$ represents the effective permeability given by $\mu_{eff}=\mu'-j\mu''$; and $\mu''$ represents a magnetic loss of the effective permeability. In FIG. 4, the effective permeability of the FeCoNiN-based thin film is more or less low at a frequency of less than 100 MHz but by far high at a frequency of more than 200 MHz.

Figure 5:
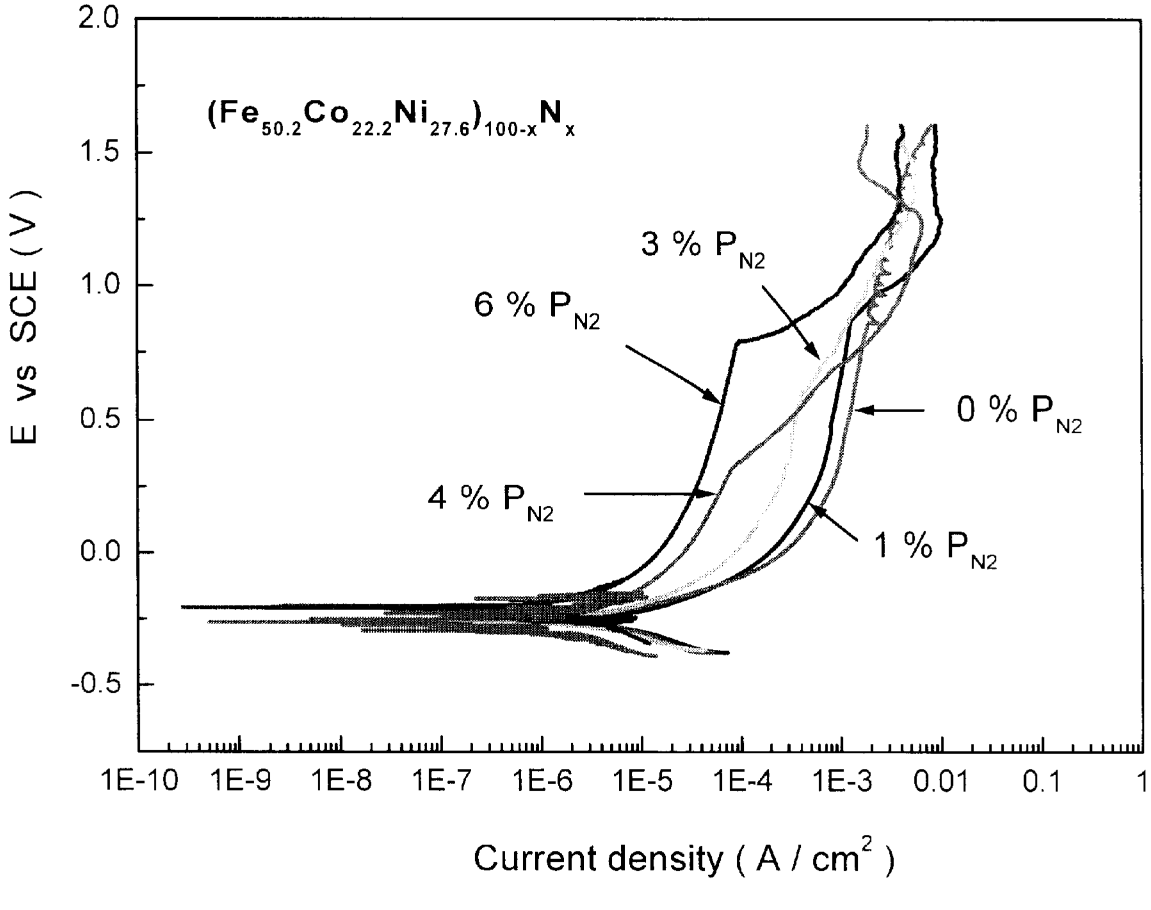
FIG. 5 is a graph showing a variation of corrosion resistance versus $N_2$ partial pressure of the FeCoNiN-based thin film according to the present invention.

In addition, FIG. 5 shows a variation of corrosion resistance of the thin film depending on the $N_2$ partial pressure, in which E vs SCE represents a voltage at the saturated calomel electrode that is a reference electrode used in the measurement of corrosion resistance. As is apparent from FIG. 5, the corrosion resistance is enhanced with an increase in the $N_2$ partial pressure.

Figure 6:
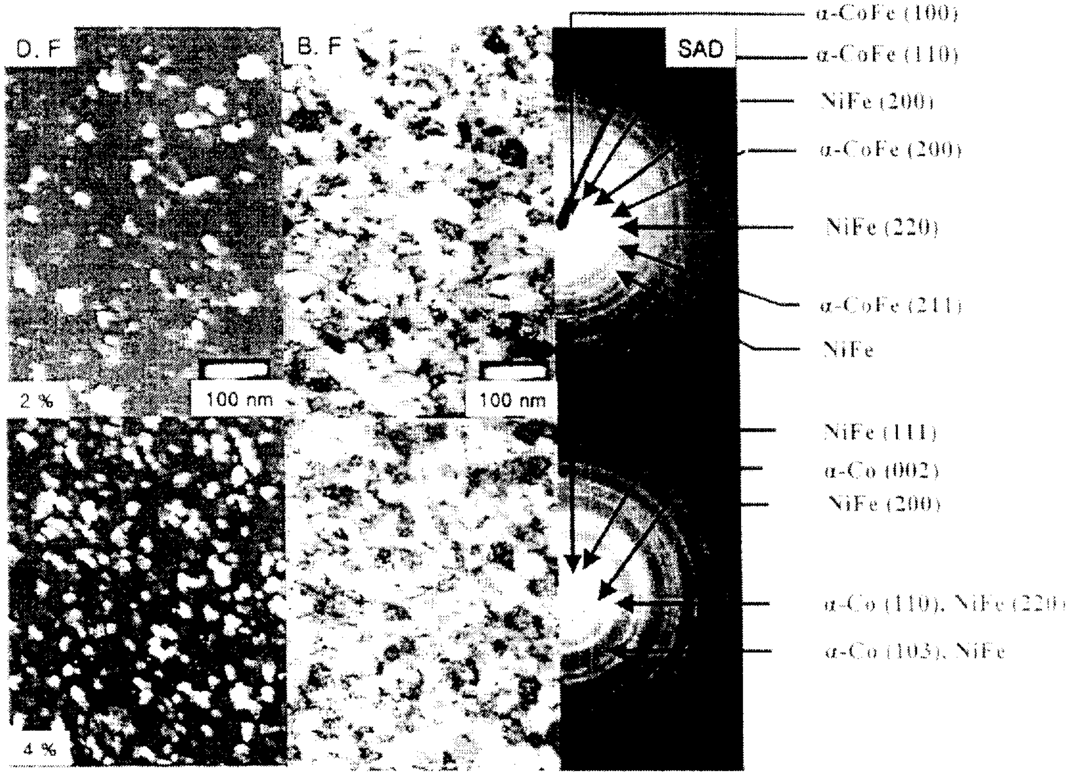
FIG. 6 presents transmission electron microscopic pictures showing the ultrafine crystalline structure of the FeCoNiN-based thin film according to the present invention when the $N_2$ partial pressure is 2% and 4%, respectively.

FIG. 6 presents transmission electron microscopic pictures showing the ultrafine crystalline structure of the thin film at the $N_2$ partial pressure of 2% and 4%, respectively, in which BF represents the bright field image, DF the dark field image, SAD the selected area diffraction. As shown in FIG. 6, the fine structure of the thin film according to the present invention has α-Co, α-FeCo, and NiFe crystalline structures of which the crystal size is ultrafine crystalline structure of 10 to 20.

TABLE 2

| A | Sample | Composition (atom %) Fe | Co | Ni | N | Saturation Magnetization (kG) | Effective Permeability ($\mu_{eff}$) 100 MHz | 600 MHz | Electrical Resistivity ($\mu\Omega \cdot$ cm) | Coercive Force (Oe) | Input Power (W) |
|---|---|---|---|---|---|---|---|---|---|---|---|
| | 1 | 52.7 | 22.0 | 25.3 | 0.0 | 19.8 | 990 | | 27 | 7.0 | 450 |
| | 2 | 52.5 | 21.6 | 25.0 | 0.9 | 19.5 | 960 | | 33 | 6.2 | 450 |
| | 3 | 46.8 | 21.7 | 29.7 | 1.8 | 18.5 | 440 | 410 | 67 | 3.5 | 450 |
| | 4 | 46.1 | 20.9 | 31.0 | 2.0 | 18.3 | 600 | 500 | 72 | 3.1 | 450 |
| | 5 | 54.7 | 18.0 | 25.3 | 2.0 | 18.8 | 850 | | 45 | 7.0 | 450 |
| | 6 | 45.7 | 21.8 | 29.8 | 2.7 | 17.6 | 550 | 540 | 83 | 3.0 | 450 |
| | 7 | 47.2 | 20.7 | 29.3 | 2.8 | 18.1 | 620 | 590 | 90 | 2.0 | 450 |
| | 8 | 51.2 | 21.8 | 23.9 | 3.1 | 18.1 | 710 | 520 | 102 | 2.4 | 450 |
| | 9 | 45.2 | 22.1 | 29.5 | 3.2 | 17.1 | 570 | 535 | 94 | 2.5 | 450 |
| | 10 | 44.7 | 20.3 | 31.5 | 3.5 | 17.4 | 620 | 560 | 99 | 2.2 | 450 |
| | 11 | 46.3 | 23.2 | 26.9 | 3.6 | 17.5 | 830 | 820 | 98 | 1.4 | 450 |
| | 12 | 50.5 | 21.9 | 24.0 | 3.6 | 17.9 | 780 | 550 | 108 | 2.3 | 450 |
| | 13 | 47.6 | 22.5 | 26.1 | 3.8 | 16.4 | 800 | 770 | 114 | 1.8 | 450 |
| | 14 | 44.3 | 20.5 | 31.3 | 3.9 | 17.3 | 650 | 510 | 119 | 1.7 | 450 |
| | 15 | 47.7 | 21.0 | 27.3 | 4.0 | 17.3 | 550 | 510 | 117 | 1.9 | 450 |
| | 16 | 43.9 | 23.9 | 27.9 | 4.3 | 15.5 | 570 | 530 | 120 | 2.1 | 450 |
| | 17 | 49.2 | 23.3 | 23.0 | 4.5 | 17.6 | 760 | 530 | 125 | 1.7 | 450 |

TABLE 2-continued

| A | Sample | Composition (atom %) Fe | Co | Ni | N | Saturation Magnetization (kG) | Effective Permeability ($\mu_{eff}$) 100 MHz | 600 MHz | Electrical Resistivity ($\mu\Omega \cdot$ cm) | Coercive Force (Oe) | Input Power (W) |
|---|---|---|---|---|---|---|---|---|---|---|---|
| | 18 | 50.7 | 25.6 | 19.0 | 4.7 | 17.1 | 450 | | 122 | 11.5 | 450 |
| | 19 | 52.5 | 21.6 | 21.1 | 4.8 | 15.0 | 760 | 680 | 127 | 2.0 | 450 |
| | 20 | 41.9 | 26.2 | 26.9 | 5.0 | 13.6 | 150 | | 147 | 9.0 | 450 |

Note) A: Example 1

COMPARATIVE EXAMPLE 1

A FeCoNi-based thin film having excellent soft magnetic properties was prepared by addition of a small amount of S to a basic composition of Fe, Co and Ni and deposition of the thin film using the electric plating method. The magnetic properties of the thin film are presented in Table 3.

TABLE 3

| B | Sample | Composition (atom %) Fe | Co | Ni | S | Saturation Magnetization (kG) | Coercive Force (Oe) | Effective Permeability (600 MHz) | Electrical Resistivity ($\mu\Omega \cdot$ cm) |
|---|---|---|---|---|---|---|---|---|---|
| | 1 | 23 | 65 | 12 | | 21 | 1.2 | 600 (1 MHz) | 21 |
| | 2 | 9 | 75 | 15.7 | 0.3 | 16 | 6.5 | — | 22 |

Note) B: Comparative Example 1

COMPARATIVE EXAMPLE 2

A FeCoNi-based thin film having excellent magnetic properties was prepared from three elements, i.e., Fe, Co and Ni using an electrodeposition method. The magnetic characteristics of the thin film are presented in Table 4.

TABLE 4

| C | Sample | Composition (atom %) Fe | Co | Ni | Saturation Magnetization (kG) | Coercive Force (Oe) | Effective Permeability (60 MHz) | Electrical Resistance ($\mu\Omega \cdot$ cm) |
|---|---|---|---|---|---|---|---|---|
| | 1 | 10.0 | 80.0 | 10.0 | 16.0 | 1.50 | 1000 | — |

Note) C: Comparative Example 2

It is apparent from Example 1 and Comparative Examples 1 and 2 that the effective permeability of the conventional FeCoNi-based thin film is maintained only in the frequency range of less than 10 MHz and deteriorated in the frequency range of more than 10 MHz.

On the contrary, the FeCoNiN-based thin films of the present invention have excellent soft magnetic properties, i.e., a saturation magnetization of approximately 16 to 19 kG and a low coercive force of 1.5 to 3.0 Oe, and excellent high-frequency characteristics, i.e., a high effective permeability of more than 400 to 900 even at a high frequency of 600 MHz. Also, these thin films exhibit a very high corrosion resistance relative to the conventional FeCoNi-based thin film, thus enhancing the reliability in the fabrication process of devices.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The FeCoNiN-based soft magnetic thin film of the present invention has very excellent high-frequency magnetic and corrosion characteristics and is widely used as a core material of various high-frequency thin film magnetic devices.

What is claimed is:

1. A FeCoNiN-based soft magnetic thin film composition having the formula $Fe_xCo_yNi_zN_v$, wherein x, y, z and v are expressed in atom % and satisfy $44 \leqq x \leqq 52$, $20 \leqq y \leqq 24$, $23 \leqq z \leqq 32$, $2 < v \leqq 5$, and $x+y+z+v=100$.

2. The FeCoNiN-based soft magnetic thin film as claimed in claim 1, wherein the thin film composition has a fine structure comprising nano-sized crystalline particles of α-Co, α-FeCo and NiFe in a range of 10 nm–20 nm.

* * * * *